(12) United States Patent
Widmer et al.

(10) Patent No.: US 11,731,465 B2
(45) Date of Patent: Aug. 22, 2023

(54) DE-LAMINATION RESISTANT AND INTEGRATED VISUAL WEAR INDICATOR TIRE HUB

(71) Applicant: GOODRICH CORPORATION, Charlotte, NC (US)

(72) Inventors: Jonathan L. Widmer, Jamestown, ND (US); Ryan J. Hanson, Jamestown, ND (US); Steve T. McQueen, Jamestown, ND (US); Steven E. Aesoph, Jamestown, ND (US); William F. Steinmetz, Jamestown, ND (US)

(73) Assignee: GOODRICH CORPORATION, Charlotte, NC (US)

( * ) Notice: Subject to any disclaimer, the term of this patent is extended or adjusted under 35 U.S.C. 154(b) by 0 days.

(21) Appl. No.: 17/496,014

(22) Filed: Oct. 7, 2021

(65) Prior Publication Data

US 2023/0116108 A1    Apr. 13, 2023

(51) Int. Cl.
 *B65G 39/02* (2006.01)
 *B65G 13/11* (2006.01)
 *B65G 13/06* (2006.01)
 *B64D 9/00* (2006.01)
 *B60C 11/24* (2006.01)

(52) U.S. Cl.
 CPC .............. *B60C 11/24* (2013.01); *B65G 39/02* (2013.01); *B65G 2207/48* (2013.01)

(58) Field of Classification Search
 None
 See application file for complete search history.

(56) References Cited

U.S. PATENT DOCUMENTS

| | | | | |
|---|---|---|---|---|
| 3,712,454 | A * | 1/1973 | McKee | B65G 13/065 198/782 |
| 4,077,590 | A * | 3/1978 | Shorey | B64D 9/003 414/532 |
| 4,134,345 | A * | 1/1979 | Baldwin | B60P 7/132 410/70 |
| 6,604,258 | B2 * | 8/2003 | Saggio | B60B 33/0068 16/48 |
| 6,645,415 | B2 | 11/2003 | Takatsu | |
| 6,814,222 | B2 * | 11/2004 | Henson | B65G 47/261 198/781.09 |
| 7,717,252 | B2 * | 5/2010 | Stewart | B65G 13/065 198/782 |
| 9,238,504 | B2 * | 1/2016 | Huber | B64C 1/20 |
| 9,273,772 | B2 * | 3/2016 | Ichikawa | F16H 55/48 |
| 10,562,351 | B2 | 2/2020 | Purushothaman et al. | |
| 2005/0015986 | A1 * | 1/2005 | Stebnicki | B29C 48/07 29/895.32 |

* cited by examiner

*Primary Examiner* — Kavel Singh
(74) *Attorney, Agent, or Firm* — Snell & Wilmer L.L.P.

(57) ABSTRACT

A drive wheel for a power drive unit of a cargo handling system is disclosed. One aspect of the drive wheel is that it includes one or more wear indicators for a tire of the drive wheel. Another aspect of the drive wheel is that it includes one or more features (e.g., at least one protrusion, alone or in combination with one or more slots) that resists relative rotational movement between the tire of the drive wheel and the hub of the drive wheel.

18 Claims, 12 Drawing Sheets

DE-LAMINATION RESISTANT AND INTEGRATED VISUAL WEAR INDICATOR TIRE HUB

FIELD

The present disclosure relates generally to cargo handling systems and, more particularly, to a drive wheel of a power drive unit for such a cargo handling system.

BACKGROUND

Cargo handling systems for aircraft typically include various tracks and rollers disposed on a cargo deck that spans the length of a cargo compartment. Cargo may be loaded through an entrance of the aircraft and transported by the cargo handling system to forward or aft locations (relative to the entrance), depending upon the configuration of the aircraft. Cargo handling systems, such as, for example, those used on aircraft for transport of containers, cargo, containerized cargo or pallets, also referred to herein as unit load devices (ULDs), typically include roller trays containing transport rollers that support and transport ULDs. Motor driven tires or rollers are typically employed in these systems. In certain aircraft, a plurality of motor-driven power drive units (PDUs) are used to move, transport, or drive ULDs within the cargo compartment. This configuration facilitates transportation of ULDs within the cargo compartment by one or more operators or agent-based systems controlling operation of the PDUs.

SUMMARY

A drive wheel for a power drive unit of a cargo handling system is presented herein. Both the configuration of such a drive wheel and the operation/assembly/manufacture of such a drive wheel are within the scope of this Summary.

A cargo handling system may include a conveyance surface (e.g., a cargo deck) and at least one power drive unit that includes at least one of the above-noted drive wheels and any appropriate rotational drive source (e.g., a motor of any appropriate size, shape, configuration, and/or type). In at least one configuration, at least part of the drive wheel protrudes beyond the conveyance surface. Protrusion of at least part of the drive wheel beyond the conveyance surface allows the drive wheel to engage a ULD and advance the ULD along the conveyance surface through rotation of the drive wheel by the rotational drive source. The cargo handling system may be incorporated by an aircraft of any appropriate type in various embodiments.

In a first aspect, the drive wheel includes a hub and a tire, with the tire being disposed about/mounted on/to the hub. An outer perimeter of the hub includes one or more protrusions. An inner perimeter of the tire is at least one of disposed in engagement with or closely spaced relation to the outer perimeter of the hub and including relative to any one or more of such protrusions. Each protrusion (e.g., protruding outwardly relative to a rotational axis of the drive wheel) disposed on the outer perimeter of the hub may be of any appropriate configuration, such as a post, rail, rib, or the like (e.g., ribs may have any appropriate cross-sectional configuration; all ribs may be of a common cross-sectional configuration; at least two ribs may be of a common cross-sectional configuration, at least two ribs may have different cross-sectional configurations, or a combination thereof).

The outer perimeter of the hub may also include one or more slots. Each slot (e.g., extending inwardly relative to a rotational axis of the drive wheel; a concavity) disposed on the outer perimeter of the hub may be of any appropriate configuration (e.g., slots may have any appropriate cross-sectional configuration; all slots may be of a common cross-sectional configuration; at least two slots may be of a common cross-sectional configuration, at least two slots may have different cross-sectional configurations, or a combination thereof). Incorporating at least one protrusion, alone or in combination with at least one slot, on the outer perimeter of the hub reduces the potential for relative rotational movement between the tire and the hub when the tire is engaging cargo and the drive wheel is being rotated to advance the cargo along an appropriate surface. One or more of the noted protrusions may also provide the function of a visual wear indicator for the tire.

Any appropriate arrangement of multiple protrusions, alone or in combination with one or more slots, may be incorporated on the outer perimeter of the hub (e.g., multiple protrusions may be disposed in equally-spaced relation about the rotational axis of the drive wheel; multiple protrusions may be disposed such that there is a different spacing between each adjacent pair of protrusions proceeding about the rotational axis of the drive wheel; at least one adjacent pair of protrusions may be disposed in equally-spaced relation about the rotational axis of the drive wheel, at least one adjacent pair of protrusions may be disposed other than equally-spaced relation about the rotational axis of the drive wheel, or any combination thereof, the plurality of protrusions may be symmetrically-disposed about the rotational axis of the drive wheel; the plurality of protrusions may be asymmetrically-disposed about the rotational axis of the drive wheel). A remainder of the outer perimeter of the hub (such a remainder being other than each protrusion and slot) may be cylindrical, with a cylindrical center corresponding with a rotational axis of the drive wheel.

The tire may be a solid structure proceeding from an inner perimeter of the tire to an outer perimeter of the tire (e.g., the tire may be non-inflatable structure; the outer perimeter of the tire may be characterized as a ULD engagement surface). An appropriate bond may exist between the inner perimeter of the tire (e.g., a tire mounting surface) and the outer perimeter of the hub (e.g., a hub mounting surface), such as by using an appropriate adhesive, bonding agent, or the like. The tire may be molded onto the hub (e.g., molten rubber injected into a mold under high pressure; the tire may be over-molded onto the hub) in various embodiments, including where the outer perimeter of the hub is first processed (e.g., sanding, bead blasting, chemical etching) to enhance the joinder of the tire to the hub and including via the noted adhesive, bonding agent, or the like. The tire may also be mechanically attached/mounted to the hub. Any appropriate way of mounting the tire onto the hub may be utilized.

Including at least one protrusion on the outer perimeter of the hub again may reduce the potential for relative rotational motion between the hub and the tire when the tire engages cargo and the drive wheel is rotated to advance the cargo along an appropriate surface. One or more of protrusions on the outer perimeter of the hub may also function as a visual wear indicator. In a first configuration, a given protrusion on the outer perimeter of the hub is recessed relative to an outer perimeter of the tire (e.g. indicative of the tire having "acceptable" remaining "tread"; indicative that the tire has "acceptable wear"; indicative that the tire is not yet in need of replacement and/or refurbishment; a portion of the tire still being disposed in overlying relation to the protrusion, such that the protrusion is not exposed on the outer perimeter of the tire). In a second configuration, a given protrusion on the outer perimeter of the hub is visible on the outer perimeter of the tire (e.g., indicative of a replacement condition for the drive wheel (or at least the tire); indicative that the tire should be replaced and/or refurbished; the tire having worn away to expose at least part of the protrusion).

In a second aspect, the drive wheel includes a hub and a tire, with the tire being disposed about/mounted to the hub. An outer perimeter of the hub includes at least one visual wear indicator. When the tire has worn to at least a certain extent (e.g., by a "thinning" of the tire, for instance its wall thickness), at least one visual wear indicator becomes visible on the outer perimeter of the tire. Each visual wear indicator may be in form of a protrusion of any appropriate configuration that is incorporated on an outer perimeter of the hub. Each feature addressed above in relation to the first aspect may be used by this second aspect, individually and in any appropriate combination.

Various aspects of the present disclosure are also addressed by the following paragraphs and in the noted combinations:

1. A cargo handling system, comprising:
   a conveyance surface; and a power drive unit comprising
      a drive wheel and a drive source operatively interconnected with said drive wheel, wherein said drive wheel is at least disposable beyond said conveyance surface, and wherein said drive wheel comprises:
      a hub comprising a mounting surface, wherein said mounting surface comprises at least one protrusion; and
      a tire mounted on said hub and that interfaces with said mounting surface and said at least one protrusion.

2. The cargo handling system of paragraph 1, wherein said at least one protrusion comprises a first rib.

3. The cargo handling system of paragraph 2, wherein a length dimension of said first rib is axially extending.

4. The cargo handling system of paragraph 3, wherein said length dimension of said first rib is oriented at least substantially parallel with a rotational axis of said drive wheel.

5. The cargo handling system of paragraph 2, wherein said first rib is annular proceeding about a rotational axis of said drive wheel.

6. The cargo handling system of paragraph 2, wherein said first rib is an arcuate segment that proceeds about only a portion of a rotational axis of said drive wheel.

7. The cargo handling system of paragraph 1, wherein said at least one protrusion comprises a plurality of protrusions, wherein said plurality of protrusions comprises a plurality of ribs, and wherein each protrusion of said plurality of protrusions comprises a rib of said plurality of ribs.

8. The cargo handling system of paragraph 7, wherein a length dimension of each said rib is axially extending.

9. The cargo handling system of paragraph 8, wherein said length dimension of each said rib is oriented at least substantially parallel with a rotational axis of said drive wheel.

10. The cargo handling system of paragraph 9, wherein said plurality of ribs are at least substantially equally-spaced about said rotational axis.

11. The cargo handling system of any of paragraphs 9-10, wherein said mounting surface further comprises at least one slot disposed between each adjacent pair of said ribs.

12. The cargo handling system of paragraph 11, wherein a length dimension of each slot of said at least one slot is axially extending.

13. The cargo handling system of paragraph 12, wherein said length dimension of each said slot is oriented at least substantially parallel with said rotational axis of said drive wheel.

14. The cargo handling system of any of paragraphs 11-13, wherein a plurality of said slots are at least substantially equally-spaced about said rotational axis.

15. The cargo handling system of any of paragraphs 8-10, wherein said mounting surface further comprises a continuous arcuate surface extending between each adjacent pair of said ribs.

16. The cargo handling system of paragraph 7, wherein each said rib is annular proceeding about a rotational axis of said drive wheel.

17. The cargo handling system of paragraph 16, wherein said plurality of ribs are at least substantially equally-spaced along said rotational axis.

18. The cargo handling system of paragraph 7, wherein each said rib is an arcuate segment that proceeds about only a portion of a rotational axis of said drive wheel.

19. The cargo handling system of paragraph 18, further comprising a plurality of groups that are spaced about said rotational axis, wherein each group of said plurality of groups comprises multiple said ribs spaced along said rotational axis.

20. The cargo handling system of paragraph 19, wherein said plurality groups are at least substantially equally-spaced about said rotational axis.

21. The cargo handling system of any of paragraphs 19-20, wherein said mounting surface further comprises at least one slot disposed between each adjacent pair of said groups.

22. The cargo handling system of paragraph 21, wherein a length dimension of each slot of said at least one slot is axially extending.

23. The cargo handling system of paragraph 22, wherein said length dimension of each said slot is oriented at least substantially parallel with said rotational axis.

24. The cargo handling system of any of paragraphs 1-23, wherein said tire is at least one of bonded, adhered, or mechanically joined to said mounting surface of said hub.

25. The cargo handling system of any of paragraphs 1-24, wherein said tire is a solid.

26. The cargo handling system of paragraph 25, wherein said tire comprises an inner surface and an outer surface that are spaced in a thickness dimension of said tire, and wherein said inner surface at least one of interfaces with or is disposed in closely spaced relation to an entirety of said mounting surface of said hub.

27. The cargo handling system of any of paragraphs 1-26, wherein said drive wheel further comprises:
   a first configuration where said at least one protrusion is recessed relative to an outer surface of said tire and is indicative of acceptable wear; and
   a second configuration where said at least one protrusion is visible on said outer surface of said tire and is indicative of a replacement condition for said drive wheel.

28. An aircraft comprising a ULD and the cargo handling system of any of paragraphs 1-27, wherein said ULD is disposed on said conveyance surface and comprises a lower surface that is engaged by said tire of said drive wheel to advance said ULD along said conveyance surface.

29. The aircraft of paragraph 28, wherein said ULD is metallic.

30. A method of making a drive wheel for a power drive unit of a cargo handling system, comprising:
   molding a tire onto a hub, said hub comprising a visual wear indicator, wherein said visual wear indicator comprises at least one protrusion.

31. The method of paragraph 30, wherein said tire is in accordance with any of paragraphs 1-27.

32. The method of any of paragraphs 30-31, wherein said hub is in accordance with any of paragraphs 1-27.

33. The method of any of paragraphs 30-32, wherein said at least one protrusion is in accordance with any of paragraphs 1-27.

34. A drive wheel for a power drive unit of a cargo handling system, comprising:
a hub comprising a hub mounting surface, wherein said hub mounting surface comprises a plurality of protrusions; and
a tire mounted on said hub, wherein said tire comprises a tire mounting surface and a ULD engagement surface that are spaced in a thickness dimension of said tire, wherein said tire is a solid extending from said tire mounting surface to said ULD engagement surface, and wherein said tire mounting surface is at least one of disposed in contact with or in closely spaced relation to said hub mounting surface and said plurality of protrusions.

35. The drive wheel of paragraph 34, wherein said tire is at least one of bonded, adhered, or mechanically joined to said hub mounting surface of said hub.

36. The drive wheel of paragraph 34, wherein said plurality of protrusions comprises a plurality of ribs, and wherein each protrusion of said plurality of protrusions comprises a rib of said plurality of ribs.

37. The drive wheel of paragraph 36, wherein a length dimension of each said rib is axially extending.

38. The drive wheel of paragraph 37, wherein said length dimension of each said rib is oriented at least substantially parallel with a rotational axis of said drive wheel.

39. The drive wheel of paragraph 38, wherein said plurality of ribs are at least substantially equally-spaced about said rotational axis.

40. The drive wheel of any of paragraphs 38-39, wherein said mounting surface further comprises at least one slot disposed between each adjacent pair of said ribs.

41. The drive wheel of paragraph 40, wherein a length dimension of each slot of said at least one slot is axially extending.

42. The drive wheel of paragraph 41, wherein said length dimension of each said slot is oriented at least substantially parallel with said rotational axis of said drive wheel.

43. The drive wheel of any of paragraphs 40-42, wherein a plurality of slots are at least substantially equally-spaced about said rotational axis.

44. The drive wheel of any of paragraphs 36-39, wherein said mounting surface further comprises a continuous arcuate surface extending between each adjacent pair of said ribs.

45. The drive wheel of paragraph 36, wherein each said rib is annular proceeding about a rotational axis of said drive wheel.

46. The drive wheel of paragraph 45, wherein said plurality of ribs are at least substantially equally-spaced along said rotational axis 47. The drive wheel of paragraph 36, wherein each said rib is an arcuate segment that proceeds about only a portion of a rotational axis of said drive wheel.

48. The drive wheel of paragraph 47, further comprising a plurality of groups that are spaced about said rotational axis, wherein each group of said plurality of groups comprises multiple said ribs spaced along said rotational axis.

49. The drive wheel of paragraph 48, wherein said plurality groups are at least substantially equally-spaced about said rotational axis.

50. The drive wheel of any of paragraphs 48-49, wherein said mounting surface further comprises at least one slot disposed between each adjacent pair of said groups.

51. The drive wheel of paragraph 50, wherein a length dimension of each slot of said a least one slot is axially extending.

52. The drive wheel of paragraph 51, wherein said length dimension of each said slot is oriented at least substantially parallel with said rotational axis.

53. The drive wheel of any of paragraphs 34-52, wherein said drive wheel further comprises:
a first configuration where each protrusion of said plurality of protrusions is recessed relative to an outer surface of said tire and is indicative of acceptable wear; and
a second configuration where at least one said protrusion of said plurality of protrusions is visible on said outer surface of said tire and is indicative of a replacement condition for said drive wheel.

54. The drive wheel of any of paragraphs 34-52, further comprising a visual wear indicator for said tire, wherein at least one protrusion of said plurality of protrusions comprises said visual wear indicator.

55. A drive wheel for a power drive unit of a cargo handling system, comprising:
a hub comprising a hub mounting surface, wherein said hub mounting surface comprises at least one visual wear indicator;
a tire mounted on said hub and in overlying relation to said at least one visual wear indicator, wherein said at least one visual wear indicator is visible on an outer surface of said tire when said tire has worn and reached a replacement condition.

56. The drive wheel of paragraph 55, wherein said hub is in accordance with any of paragraphs 34-52.

57. The drive wheel of any of paragraphs 55-56, wherein said tire is in accordance with any of paragraphs 34-52.

58. The drive wheel of any of paragraphs 55-57, wherein said at least one visual wear indicator is in accordance with at least one of said plurality of protrusions of any of paragraphs 34-52.

BRIEF DESCRIPTION OF THE DRAWINGS

The subject matter of the present disclosure is particularly pointed out and distinctly claimed in the concluding portion of the specification. An understanding of the present disclosure may be further facilitated by referring to the following detailed description and claims in connection with the following drawings. While the drawings illustrate various embodiments employing the principles described herein, the drawings do not limit the scope of the claims. Reference to "in accordance with various embodiments" in this Brief Description of the Drawings also applies to the corresponding discussion in the Detailed Description.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Figure 1A:
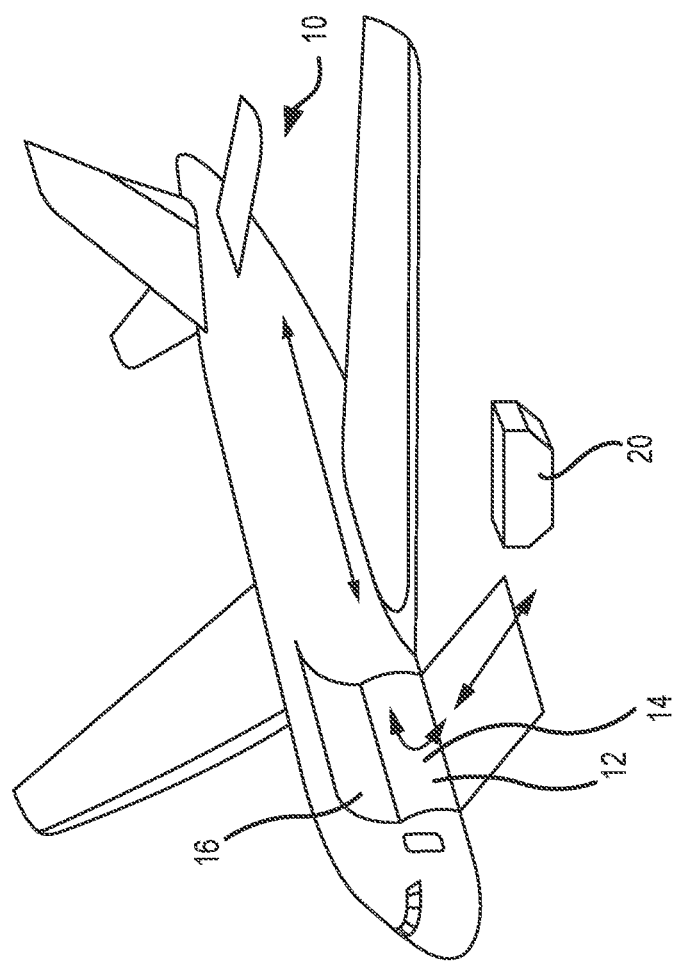
FIG. 1A illustrates a schematic of an aircraft being loaded with cargo, in accordance with various embodiments.

With reference to FIG. 1A, a schematic view of an aircraft 10 having a cargo deck 12 located within a cargo compartment 14 is illustrated, in accordance with various embodiments. The aircraft 10 may comprise a cargo load door 16 located, for example, at one side of a fuselage structure of the aircraft 10. A unit load device (ULD) 20 may be loaded through the cargo load door 16 and onto the cargo deck 12 of the aircraft 10 or, conversely, unloaded from the cargo deck 12 of the aircraft 10. In general, ULDs are available in various sizes and capacities, and are typically standardized in dimension and shape. Once loaded with items destined for shipment, the ULD 20 is transferred to the aircraft 10 and then loaded onto the aircraft 10 through the cargo load door 16 using a conveyor ramp, scissor lift or the like. Once inside the aircraft 10, the ULD 20 is moved within the cargo compartment 14 to a final stowed position. Multiple ULDs may be brought on-board the aircraft 10, with each ULD 20 being placed in a respective stowed position on the cargo deck 12. After the aircraft 10 has reached its destination, each ULD 20 is unloaded from the aircraft 10 in similar fashion, but in reverse sequence to the loading procedure. To facilitate movement of the ULD 20 along the cargo deck 12, the aircraft 10 may include a cargo handling system as described herein in accordance with various embodiments.

Figure 1B:
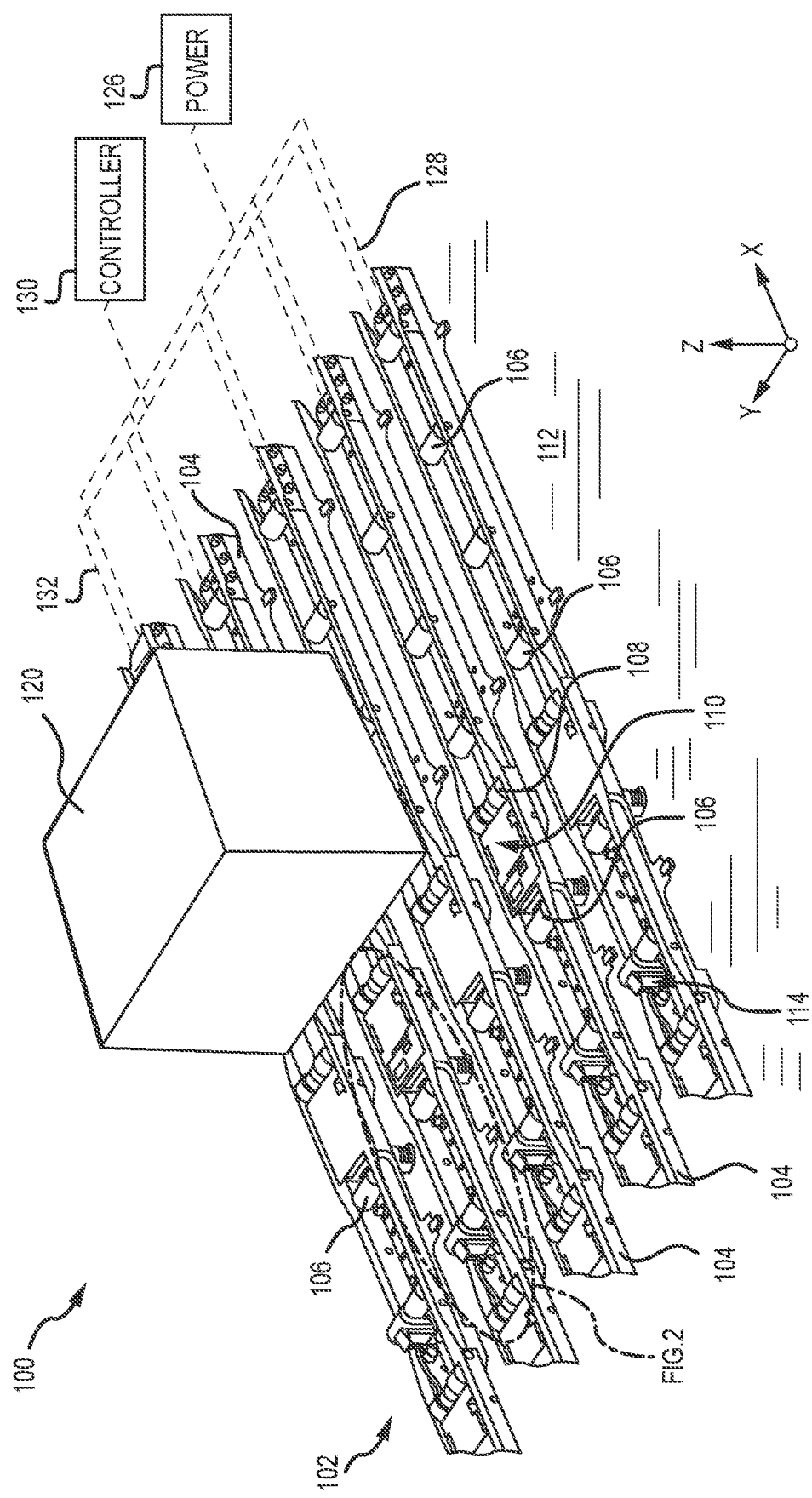
FIG. 1B illustrates a portion of a cargo handling system, in accordance with various embodiments.

Referring now to FIG. 1B, a portion of a cargo handling system 100 is illustrated, in accordance with various embodiments. The cargo handling system 100 is illustrated with reference to an XYZ coordinate system, with the X-direction extending longitudinally and the Z-direction extending vertically with respect to an aircraft in which the cargo handling system 100 is positioned, such as, for example, the aircraft 10 described above with reference to FIG. 1A. In various embodiments, the cargo handling system 100 may define a conveyance surface 102 having a plurality of trays 104 supported by a cargo deck 112, such as, for example, the cargo deck 12 described above with reference to FIG. 1A. The plurality of trays 104 may be configured to support a unit load device (ULD) 120 (or a plurality of ULDs), such as, for example, the unit load device (ULD) 20 described above with reference to FIG. 1A. In various embodiments, the ULD 120 may comprise a container or a pallet configured to hold cargo as described above. In various embodiments, the plurality of trays 104 is disposed throughout the cargo deck 112 and may support a plurality of conveyance rollers 106, where one or more or all of the plurality of conveyance rollers 106 is a passive roller.

In various embodiments, the plurality of trays 104 may further support a plurality of power drive units (PDUs) 110, each of which may include one or more drive wheels or rollers 108 that may be actively powered by a motor. In various embodiments, one or more of the plurality of trays 104 is positioned longitudinally along the cargo deck 112— e.g., along the X-direction extending from the forward end to the aft end of the aircraft. In various embodiments, the plurality of conveyance rollers 106 and the one or more drive rollers 108 may be configured to facilitate transport of the ULD 120 in the forward and the aft directions along the conveyance surface 102. During loading and unloading, the ULD 120 may variously contact the one or more drive rollers 108 to provide a motive force for transporting the ULD 120 along the conveyance surface 102. Each of the plurality of PDUs 110 may include an actuator, such as, for example, an electrically operated motor, configured to drive the one or more drive rollers 108 corresponding with each such PDU 110. In various embodiments, the one or more drive rollers 108 may be raised from a lowered position beneath the conveyance surface 102 to an elevated position protruding above the conveyance surface 102 by the corresponding PDU. As used with respect to cargo handling system 100, the term "beneath" may refer to the negative Z-direction, and the term "above" may refer to the positive Z-direction with respect to the conveyance surface 102. In the elevated position, the one or more drive rollers 108 variously contact and drive the ULD 120 that otherwise rides on the plurality of conveyance rollers 106. Other types of PDUs, which can also be used in various embodiments of the present disclosure, may include a drive roller that is held or biased in a position above the conveyance surface by a spring. PDUs as disclosed herein may be any type of electrically powered rollers that may be selectively energized to propel or drive the ULD 120 in a desired direction over the cargo deck 112 of the aircraft. The plurality of trays 104 may further support a plurality of restraint devices 114. In various embodiments, each of the plurality of restraint devices 114 may be configured to rotate downward as the ULD 120 passes over and along the conveyance surface 102. Once the ULD 120 passes over any such one of the plurality of restraint devices 114, such restraint device 114 returns to its upright position, either by a motor driven actuator or a bias member, thereby restraining or preventing the ULD 120 from translating in the opposite direction.

In various embodiments, the cargo handling system 100 may include a system controller 130 in communication with each of the plurality of PDUs 110 via a plurality of channels 132. Each of the plurality of channels 132 may be a data bus, such as, for example, a controller area network (CAN) bus. An operator may selectively control operation of the plurality of PDUs 110 using the system controller 130. In various embodiments, the system controller 130 may be configured to selectively activate or deactivate the plurality of PDUs 110. Thus, the cargo handling system 100 may receive operator input through the system controller 130 to control the plurality of PDUs 110 in order to manipulate movement of the ULD 120 over the conveyance surface 102 and into a desired position on the cargo deck 112. In various embodiments, the system controller 130 may include a general purpose processor, a digital signal processor (DSP), an application specific integrated circuit (ASIC), a field programmable gate array (FPGA) or some other programmable logic device, discrete gate or transistor logic, discrete hardware components, or any combination thereof. The cargo handling system 100 may also include a power source 126 configured to supply power to the plurality of PDUs 110 or to the plurality of restraint devices 114 via one or more power busses 128. The system controller 130 may be complimented by or substituted with an agent-based control system, whereby control of each PDU and associated componentry—e.g., the restraint devices—is performed by individual unit controllers associated with each of the PDUs and configured to communicate between each other.

Figure 2:
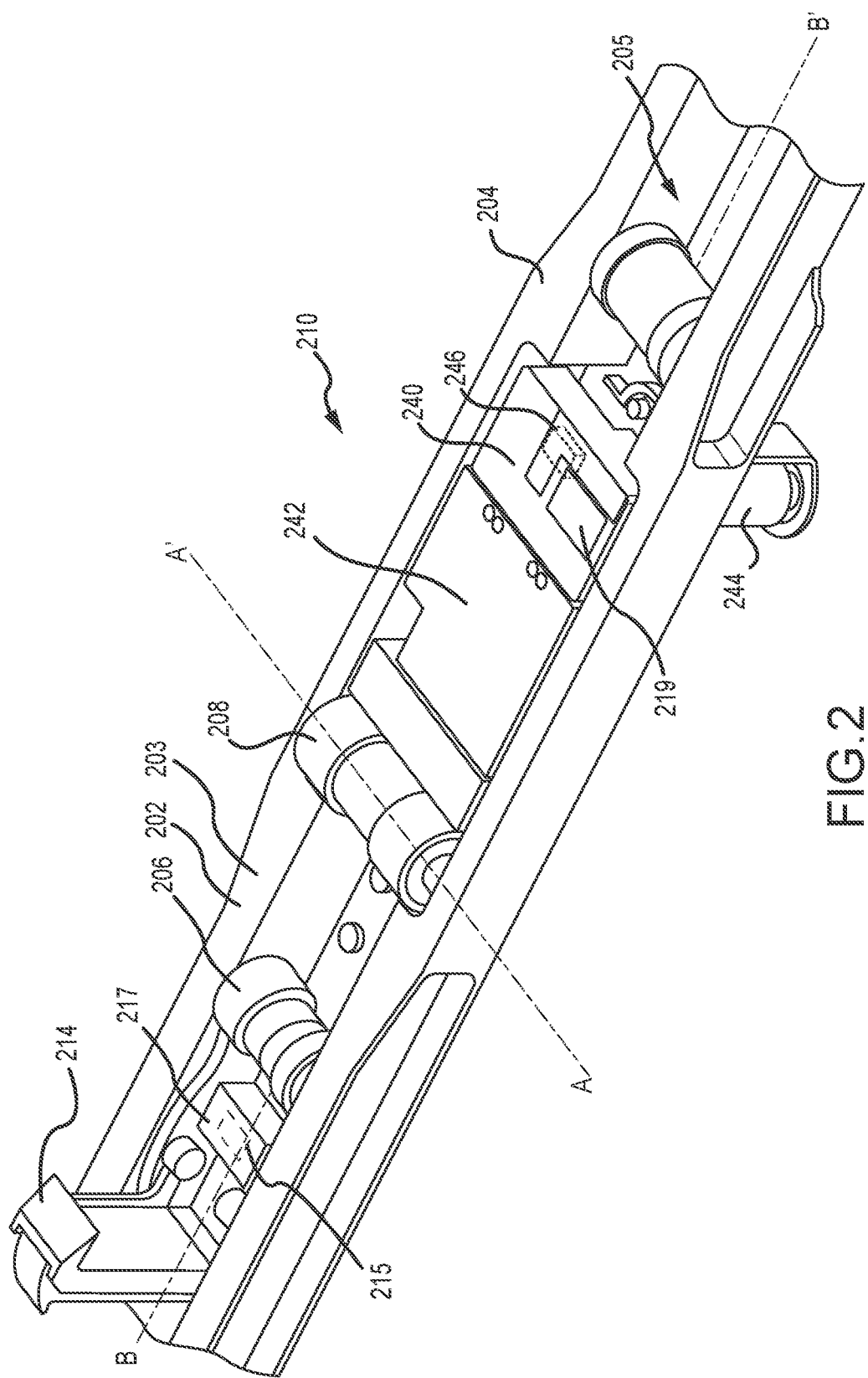
FIG. 2 illustrates a portion of a cargo handling system, in accordance with various embodiments.

Referring now to FIG. 2, a PDU 210, such as for example, one of the plurality of PDUs 110 described above with reference to FIG. 1B, is illustrated disposed in a tray 204, in accordance with various embodiments. The PDU 210 may rotate the drive roller 208 in one of two possible directions (e.g., clockwise or counterclockwise) to move the ULD in a direction parallel to the longitudinal axis B-B' of the tray 204 or in a direction that is perpendicular to the longitudinal axis B-B'. The PDU 210 may comprise a unit controller 240, a unit motor 242 and a drive roller 208 mounted within an interior section 205 of the tray 204. The drive roller 208 may comprise a cylindrical wheel coupled to a drive shaft and configured to rotate about an axis A-A'. The drive roller 208 may be in mechanical communication with the unit motor 242, which may be, for example, an electromagnetic, electromechanical or electrohydraulic actuator or other servomechanism. The PDU 210 may further include gear assemblies and other related components for turning or raising the drive roller 208 so that the drive roller 208 may extend, at least partially, above a conveyance surface 202 which, in various embodiments, may be defined as the uppermost surface 203 of the tray 204. At least partial extension of the drive roller 208 above the conveyance surface 202 facilitates contact between the drive roller 208 and a lower surface of a ULD, such as, for example, the ULD 120 described above with reference to FIG. 1B. In various embodiments, the unit controller 240 is configured to control operation of the drive roller 208. The unit controller 240 may include a processor and a tangible, non-transitory memory. The processor may comprise one or more logic modules that implement logic to control rotation and elevation of the drive roller 208. In various embodiments, the PDU 210 may comprise other electrical devices to implement drive logic. In various embodiments, a connector 244 is used to couple the electronics of the PDU 210 to a power source and a system controller, such as, for example, the system controller 130 described above with reference to FIG. 1B. The connector 244 may have pins or slots and may be configured to couple to a wiring harness having pin programing. The unit controller 240 may be configured to receive commands from the system controller through the connector 244 in order to control operation of the unit motor 242.

In addition, a restraint device 214, such as, for example, one of the plurality of restraint devices 114 described above with reference to FIG. 1B, is illustrated as disposed within the tray 204 and configured to operate between a stowed position, whereby the ULD may pass over the restraint device, and a deployed position (as illustrated), whereby the ULD is restrained or prevented from translation in a longitudinal direction (e.g., along a longitudinal axis B-B') without the restraint device 214 first being returned to the stowed position. The restraint device 214 includes a restraint controller 215 and a restraint motor 217. In various embodiments, the restraint device 214 may be in mechanical communication with the restraint motor 217, which may be, for example, an electromagnetic, electromechanical or electrohydraulic actuator or other servomechanism. In various embodiments, the restraint controller 215 is configured to control operation of the restraint device 214. The restraint controller 215 may include a processor and a tangible, non-transitory memory. The processor may comprise one or more logic modules that implement logic to control operation of the restraint device 214 between the stowed and the deployed positions.

In various embodiments, the PDU 210 may also include a radio frequency identification device or RFID device 246, or similar device, configured to store, transmit or receive information or data—e.g., operational status or location data. Additionally, a ULD sensor 219 may be disposed within the tray 204 and configured to detect the presence of a ULD as the ULD is positioned over or proximate to the PDU 210 or the restraint device 214. In various embodiments, the ULD sensor 219 may include any type of sensor capable of detecting the presence of a ULD. For example, in various embodiments, the ULD sensor 219 may comprise a proximity sensor, a capacitive sensor, a capacitive displacement sensor, a Doppler effect sensor, an eddy-current sensor, a laser rangefinder sensor, a magnetic sensor, an active or passive optical sensor, an active or passive thermal sensor, a photocell sensor, a radar sensor, a sonar sensor, a lidar sensor, an ultrasonic sensor or the like.

Figure 3:
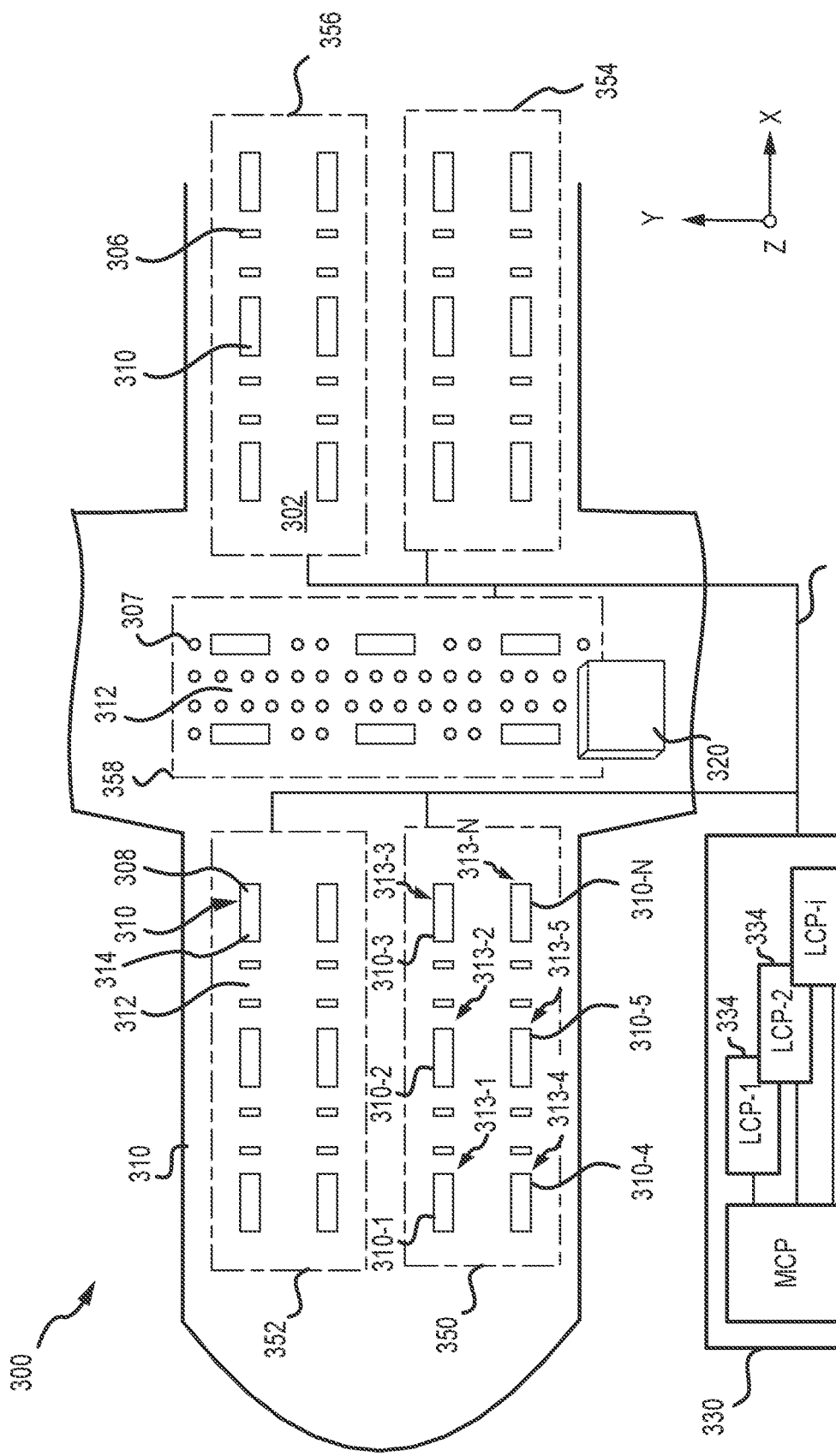
FIG. 3 illustrates a schematic view of a cargo deck having a cargo handling system with a plurality of PDUs, in accordance with various embodiments.

Referring now to FIG. 3, a schematic view of a cargo handling system 300 positioned on a cargo deck 312 of an aircraft is illustrated, in accordance with various embodiments. The cargo deck 312 may comprise a plurality of PDUs 310, generally arranged in a matrix configuration about the cargo deck 312. Associated with each of the plurality of PDUs 310 may be one or more drive rollers 308 and a restraint device 314. In various embodiments, the plurality of PDUs 310, the one or more drive rollers 308 and the restraint device 314 share similar characteristics and modes of operation as the PDU 210, drive roller 208 and restraint device 214 described above with reference to FIG. 2. Each of the one or more drive rollers 308 is generally configured to selectively protrude from a conveyance surface 302 of the cargo deck 312 in order to engage with a surface of a ULD 320 as it is guided onto and over the conveyance surface 302 during loading and unloading operations. A plurality of conveyance rollers 306 may be arranged among the plurality of PDUs 310 in a matrix configuration as well. The plurality of conveyance rollers 306 may comprise passive elements, and may include roller ball units 307 that serve as stabilizing and guiding apparatus for the ULD 320 as it is conveyed over the conveyance surface 302 by the plurality of PDUs 310.

In various embodiments, the cargo handling system 300 or, more particularly, the conveyance surface 302, is divided into a plurality of sections. As illustrated, for example, the conveyance surface 302 may include a port-side track and a starboard-side track along which a plurality of ULDs may be stowed in parallel columns during flight. Further, the conveyance surface 302 may be divided into an aft section and a forward section. Thus, the port-side and starboard-side tracks, in various embodiments and as illustrated, may be divided into four sections—e.g., a forward port-side section 350, a forward starboard-side section 352, an aft port-side section 354 and an aft starboard-side section 356. The conveyance surface 302 may also have a lateral section 358, which may be used to transport the ULD 320 onto and off of the conveyance surface 302 as well as transfer the ULD 320 between the port-side and starboard-side tracks and between the aft section and the forward section. The configurations described above and illustrated in FIG. 3 are exemplary only and may be varied depending on the context, including the numbers of the various components used to convey the ULD 320 over the conveyance surface 302. In various embodiments, for example, configurations having three or more track configurations, rather than the two-track configuration illustrated in FIG. 3, may be employed.

Each of the aforementioned sections—i.e., the forward port-side section 350, the forward starboard-side section 352, the aft port-side section 354 and the aft starboard-side section 356—may include one or more of the plurality of PDUs 310. Each one of the plurality of PDUs 310 has a physical location on the conveyance surface 302 that corresponds to a logical address within the cargo handling system 300. For purposes of illustration, the forward port-side section 350 is shown having a first PDU 310-1, a second PDU 310-2, a third PDU 310-3, a fourth PDU 310-4, a fifth PDU 310-5 and an N-th PDU 310-N. The aforementioned individual PDUs are located, respectively, at a first location 313-1, a second location 313-2, a third location 313-3, a fourth location 313-4, a fifth location 313-5 and an N-th location 303-N. In various embodiments, the location of each of the aforementioned individual PDUs on the conveyance surface 302 may have a unique location (or address) identifier, which, in various embodiments, may be stored in an RFID device, such as, for example, the RFID device 246 described above with reference to FIG. 2.

In various embodiments, an operator may control operation of the plurality of PDUs 310 using one or more control interfaces of a system controller 330, such as, for example, the system controller 130 described above with reference to FIG. 1B. For example, an operator may selectively control the operation of the plurality of PDUs 310 through an interface, such as, for example, a master control panel (MCP) 331. In various embodiments, the cargo handling system 300 may also include one or more local control panels (LCP) 334. In various embodiments, the master control panel 331 may communicate with the local control panels 334. The master control panel 331 or the local control panels 334 may also be configured to communicate with or send or receive control signals or command signals to or from each of the plurality of PDUs 310 or to a subset of the plurality of PDUs 310, such as, for example, the aforementioned individual PDUs described above with reference to the forward port-side section 350. For example, a first local control panel LCP-1 may be configured to communicate with the PDUs residing in the forward port-side section 350, a second local control panel LCP-2 may be configured to communicate with the PDUs residing in the forward starboard-side section 352, and one or more additional local control panels LCP-i may be in communication with the PDUs of one or more of the aft port-side section 354, the aft starboard-side section 356 and the lateral section 358. Thus, the master control panel 331 or local control panels 334 may be configured to allow an operator to selectively engage or activate one or more of the plurality of PDUs 310 to propel the ULD 320 along conveyance surface 302.

In various embodiments, each of the plurality of PDUs 310 may be configured to receive a command from the master control panel 331 or one or more of the local control panels 334. In various embodiments, the commands may be sent or information exchanged over a channel 332, which may provide a communication link between the system controller 330 and each of the plurality of PDUs 310. In various embodiments, a command signal sent from the system controller 330 may include one or more logical addresses, each of which may correspond to a physical address of one of the plurality of PDUs 310. Each of the plurality of PDUs 310 that receives the command signal may determine if the command signal is intended for that particular PDU by comparing its own address to the address included in the command signal.

Figure 4:
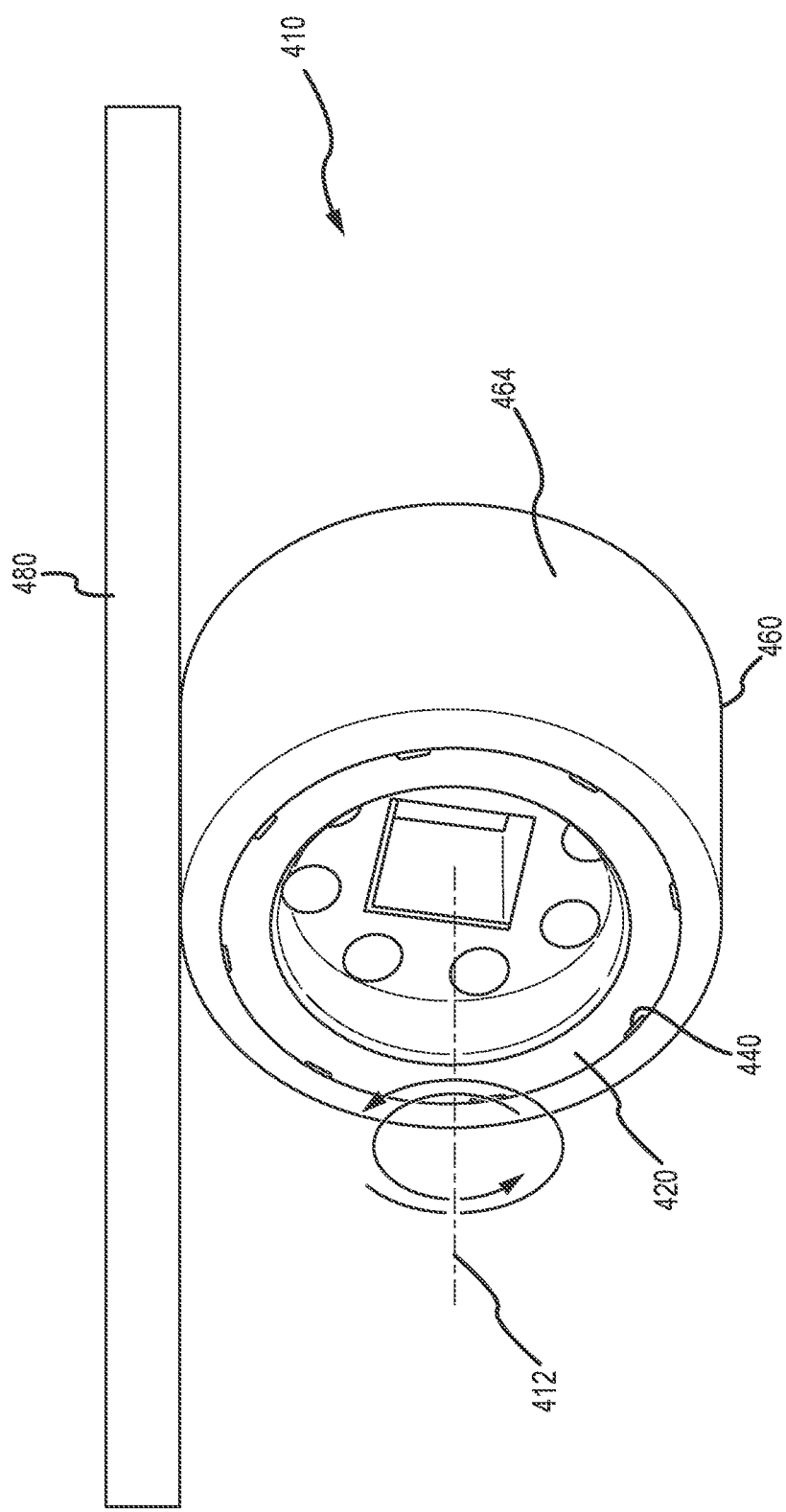
FIG. 4 is a perspective view of a drive wheel for a power drive unit of a cargo handling system in engagement with a bottom surface of a ULD, in accordance with various embodiments.

A drive roller or wheel for a PDU of a cargo handling system is illustrated in FIG. 4, is identified by reference numeral 410, and is in accordance with various embodiments. The drive wheel 410 may be used by a PDU of any appropriate configuration (e.g., PDU 110 (FIG. 1B); PDU 210 (FIG. 2); PDU 310 (FIG. 3)), and furthermore in conjunction with any appropriate cargo handling system (e.g., an aircraft cargo handling system, as addressed herein). A given PDU may include any appropriate number of drive wheels 410, including multiple drive wheels 410. The drive wheel 410 includes a tire or roller 460 that is rotated by an appropriate rotational drive or drive source (e.g., a motor). FIG. 4 also schematically illustrates a ULD 480, with the tire 460 (more specifically an outer perimeter, outer surface, or ULD engagement surface 464 of the tire 460) engaging a lower surface of the ULD 480 such that rotation of the tire 460 will advance the ULD 480 along an appropriate surface (e.g., conveyance surface 102 (FIG. 1B); conveyance surface 202 (FIG. 2); conveyance surface 302 (FIG. 3)). At least a bottom of the ULD 480 may be formed from an appropriate metal or metal alloy.

FIGS. 5A-5E present various details of the drive wheel 410. There are two primary components of the drive wheel 410—the above-noted tire or roller 460 and a hub 420. The tire 460 is mounted on the hub 420 (such as by the tire 460 being molded onto the hub 420 (e.g., using molten rubber for the tire 460), and typically under high pressure). A bonding agent, adhesive, or layer 470 may be used to bond (e.g., adhesively; chemically) the tire 460 to the hub 420. The hub 420 and the tire 460 may be concentrically disposed relative to a rotational axis 412 of the drive wheel 410.

The hub 420 may be formed from any appropriate material or combination of materials, such as a metal and/or a metal alloy (e.g., aluminum), may be formed in any appropriate manner (e.g., casting, machining), and may be of any appropriate size. The hub 420 may be characterized as including a mount 450 of any appropriate configuration (e.g., for rotatably mounting the drive wheel 400 on an axle or the like) and an annular rim 422 having an annular hub mounting surface, outer surface, or outer perimeter 424. The center of the annular rim 422 may correspond with the location of the rotational axis 412 for the drive wheel 410.

The hub mounting surface 424 of the hub 420 may include one or more protrusions in the form of ribs 430, and one or more slots 440 may be used in combination with one or more ribs 430. A remainder of the hub mounting surface 424 of the hub 420 (such a remainder being other than each rib 430 and each slot 440) may be cylindrical, with a cylindrical center corresponding with the rotational axis 412 of the drive wheel 410.

Figure 5A:
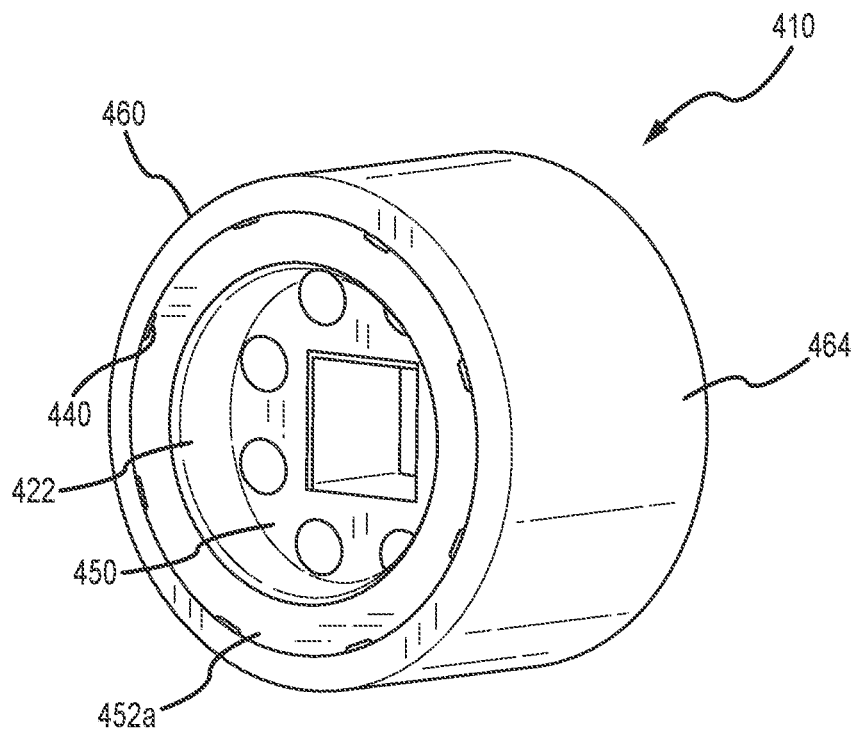
FIG. 5A is a perspective view of a drive wheel for a power drive unit of a cargo handling system, in accordance with various embodiments.
Figure 5B:
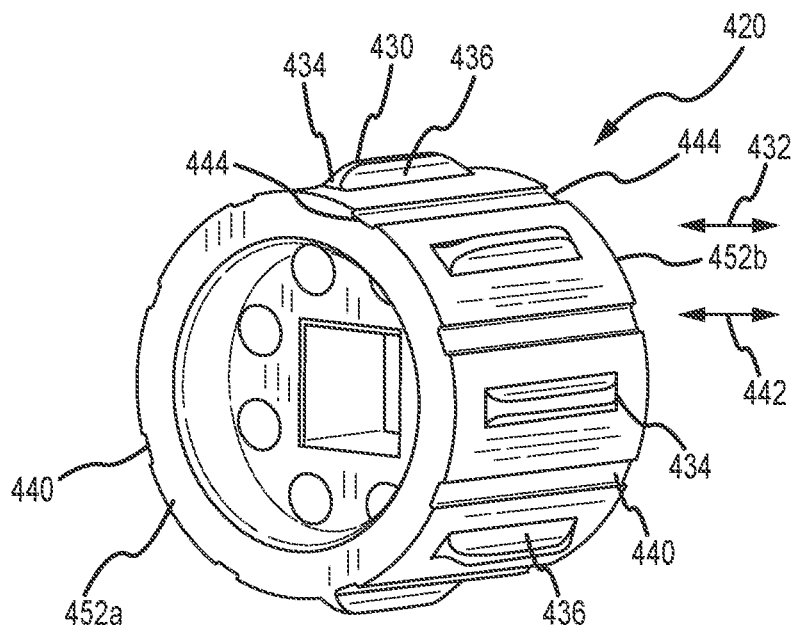
FIG. 5B is a perspective view of a hub for the drive wheel of FIG. 5A, in accordance with various embodiments.
Figure 5C:
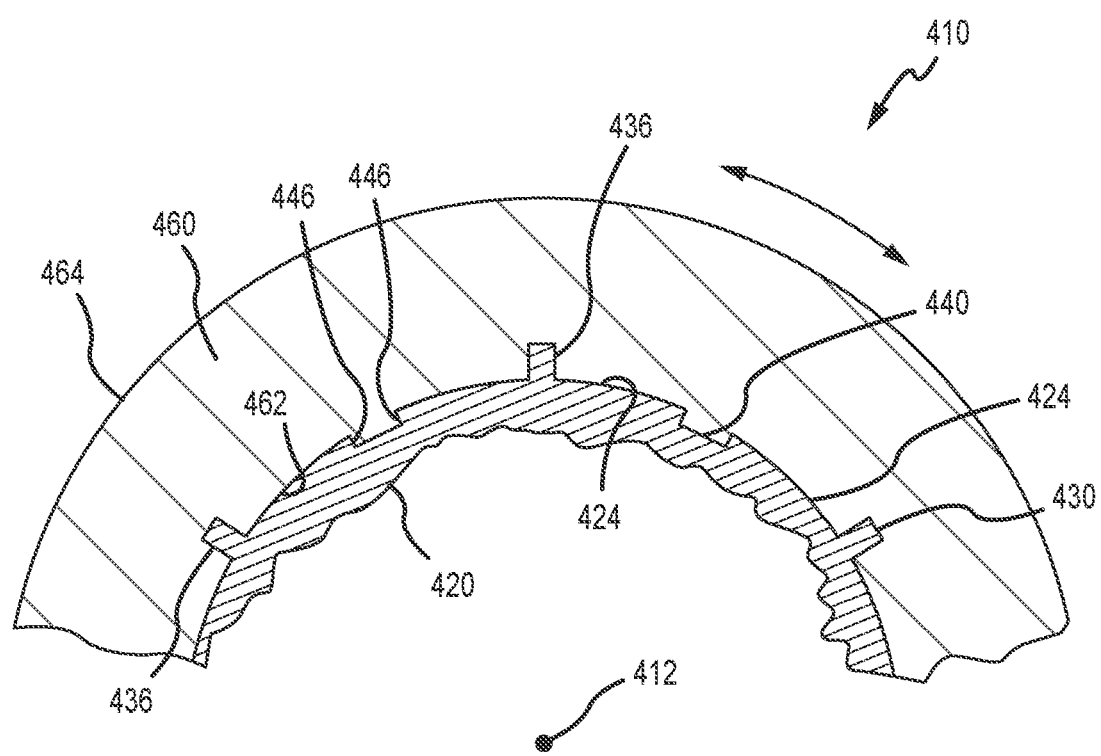
FIG. 5C is a cross-sectional view of a portion of the drive wheel of FIG. 5A for an acceptable wear configuration of a tire of the drive wheel, in accordance with various embodiments.

A plurality of ribs 430 may be radially spaced about the rotational axis 412 of the drive wheel 410. Any appropriate spacing between each adjacent pair of ribs 430 may be utilized (FIG. 5B illustrating a plurality of ribs 430 that are equally spaced about the rotational axis 412). A plurality of slots 440 may be radially spaced about the rotational axis 412 of the drive wheel 410. Any appropriate spacing between each adjacent pair of slots 440 may be utilized (FIG. 5B illustrating a plurality of slots 440 that are equally spaced about the rotational axis 412). FIG. 5B illustrates an alternating arrangement of ribs 430 and slots 440, with a slot 440 being disposed between each adjacent pair of ribs 430 and with a rib 430 being disposed between each adjacent pair of slots 440. Other arrangements may be appropriate.

Each rib 430 protrudes radially outward (relative to the rotational axis 412) relative to adjacent portions of the hub mounting surface 424. A length dimension 432 for each rib 430 may be characterized as coinciding with the spacing between a pair of ends 434 of the corresponding rib 430. The length dimension 432 of each rib 430 may be characterized as at least generally coinciding with the spacing between opposing sides 452a, 452b of the hub 420 (e.g., one end 434 of a given rib 430 will be closer to the side 452a of the hub 420, while the opposite end 434 of the same rib 430 will be closer to the opposite side 452b of the hub 420).

Each rib 430 includes a pair of rib sidewalls 436. Each rib sidewall 436 of each rib 430 is oriented such that an arc, that proceeds about the rotational axis 412 of the drive wheel 410 (including an arc that is within a plane that is perpendicular to the rotational axis 412 of the drive wheel 410; e.g., FIG. 5C) may intersect at least part of at least one rib sidewall 436 of each rib 430. FIG. 5B illustrates the length dimension 432 of each rib 430 being at least generally parallel with the rotational axis 412 of the drive wheel 410 to dispose each rib sidewall 436 in the above-noted orientation. Other orientations of the ribs 430 relative to the rotational axis 412 may be utilized and still yield the above-noted orientation of the rib sidewalls 436 (e.g., the ribs 430 could be slanted relative to the rotational axis 412 at an angle that is greater than 0° and that is less than 90°). Ribs 430 that are other than axially extending could also be utilized and still yield the above-noted orientation of the rib sidewalls 436 (e.g., the length dimension 432 of the ribs 430 could include one or more curves). Generally, the ribs 430 may be of any appropriate configuration (including any appropriate cross-sectional configuration taken perpendicular to their respective length dimension) and/or disposed in any appropriate orientation that resists relative rotational movement between the hub 420 and the tire 460. Any appropriate orientation of the ribs 430 may be used to provide at least a visual wear indicator function (e.g., FIG. 7, discussed below).

Each slot 440 is recessed radially inward (relative to the rotational axis 412) relative to adjacent portions of the hub mounting surface 424. A length dimension 442 for each slot 440 may be characterized as coinciding with the spacing between a pair of ends 444 of the corresponding slot 440. The length dimension 442 of each slot 440 may be characterized as at least generally coinciding with the spacing between opposing sides 452a, 452b of the hub 420 (e.g., one end 444 of a given slot 440 will be closer to the side 452a of the hub 420, while the opposite end 444 of the same slot 440 will be closer to the opposite side 452b of the hub 420).

Each slot 440 includes a pair of slot sidewalls 446 that are radially or circumferentially spaced from one another, and any appropriate spacing between the slot sidewalls 446 of a slot 440 may be utilized. Each slot sidewall 446 of each slot 440 is oriented such that an arc, that proceeds about the rotational axis 412 of the drive wheel 410 (including an arc that is within a plane that is perpendicular to the rotational axis 412 of the drive wheel 410; e.g., FIG. 5C) will intersect at least part of at least one slot sidewall 446 of each slot 440. FIG. 5B illustrates the length dimension 442 of each slot 440 being at least generally parallel with the rotational axis 412 of the drive wheel 410 to dispose each slot sidewall 446 in the above-noted orientation. Other orientations of the slots 440 relative to the rotational axis 412 may be utilized and still yield the above-noted orientation of the slot sidewalls 446 (e.g., the slots 440 could be slanted relative to the rotational axis 412 at an angle that is greater than 0° and that is less than 90°). Slots 440 that are other than axially extending could also be utilized and still yield the above-noted orientation of the slot sidewalls 446 (e.g., the length dimension 442 of the slots 440 could include one or more curves). Generally, the slots 440 may be of any appropriate configuration and/or disposed in any appropriate orientation that resists relative rotational movement between the hub 420 and the tire 460.

Figure 5D:
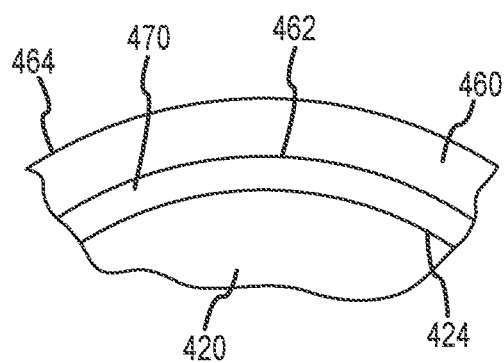
FIG. 5D is a cutaway schematic illustrating a bonding layer between the tire/roller and hub of the power drive wheel of FIG. 5A, in accordance with various embodiments.

The tire or roller 460 of the drive wheel 410 includes an outer surface, outer perimeter, or ULD engagement surface 464 and an inner surface, inner perimeter, or tire mounting surface 462. The spacing between the ULD engagement surface 464 and the tire mounting surface 462 defines a thickness of the tire 460. The tire 460 may be of a solid configuration in one or more embodiments. The ULD engagement surface 464 may be cylindrical, with the centerline of this cylinder coinciding with the rotational axis 412 of the drive wheel 410. The tire mounting surface 462 (tire 460) faces or projects toward the hub mounting surface 424 (hub 420), with the surfaces 462, 424 being disposed in at least one of closely spaced relation or in contact with one another. Again, the tire 460 may be bonded to the hub 420, for instance by a bonding layer 470 disposed between the hub mounting surface 424 and the tire mounting surface 462 (FIG. 5D showing an exaggerated thickness for this bonding layer 470). The outer perimeter 424 of the hub 420 may be processed (e.g., sanding, bead blasting, chemical etching), prior to applying to an adhesive, bonding agent, or the like to the outer perimeter 424, to enhance the joinder of the tire 460 to the hub 420. Generally, the tire 460 may be mounted to the hub 420 in any appropriate manner (e.g., at least one of bonded, adhered, or mechanically joined to the hub 420).

Relative rotation between the hub 420 and the tire 460 may adversely impact the performance of the drive wheel 410, for instance by delaminating the tire 460 from the hub 420. The above-noted ribs 430 and/or slots 440 discussed above in relation to the hub 420 resist relative rotational motion between the hub 420 and the tire 460 about/relative to the rotational axis 412. Each of the rib sidewalls 436 and the slot sidewalls 446 are oriented to resist relative motion between the tire 460 and the hub 420 as the drive wheel 410 is being driven, for instance to advance cargo in accordance with the foregoing.

Incorporating ribs 430 on the hub mounting surface 424 of the hub 420 reduces the potential for relative rotational movement between the hub 420 and the tire 460 during operation of the drive wheel 410. The ribs 430 may provide an additional function, namely as a visual wear indicator for the tire 460. FIG. 5A illustrates what may be characterized as an acceptable configuration for the tire 460. That is, there is a sufficient spacing between the tip or distal end of each rib 430 of the hub 420, and the ULD engagement surface 464 of the tire 460. Contrast this with FIG. 5E where the tire 460 has worn such that the tip or distal end of at least one rib 430 of the hub 420 is visible on the exterior of the drive wheel 410—the wall thickness of the tire 460 having been reduced such that the tip or distal and at least one rib 430 of the hub 420 has at least intersected with the ULD engagement surface 464 of the tire 460 (e.g., at least one rib 430 could actually protrude beyond the ULD engagement surface 464 of the tire 460). In any case, maintenance/operational personnel may perform a visual inspection of the tires 460 of the various drive wheels 410 to determine when one or more of the drive wheels 410 should be replaced (or possibly refurbished). The tip or distal end of the various ribs 430 (or the entirety of the hub 420) may be of a color to provide sufficient contrast with the tire 460 such that personnel may more readily determine from a visual inspection that a given tire 460 should be replaced/refurbished.

Figure 5E:
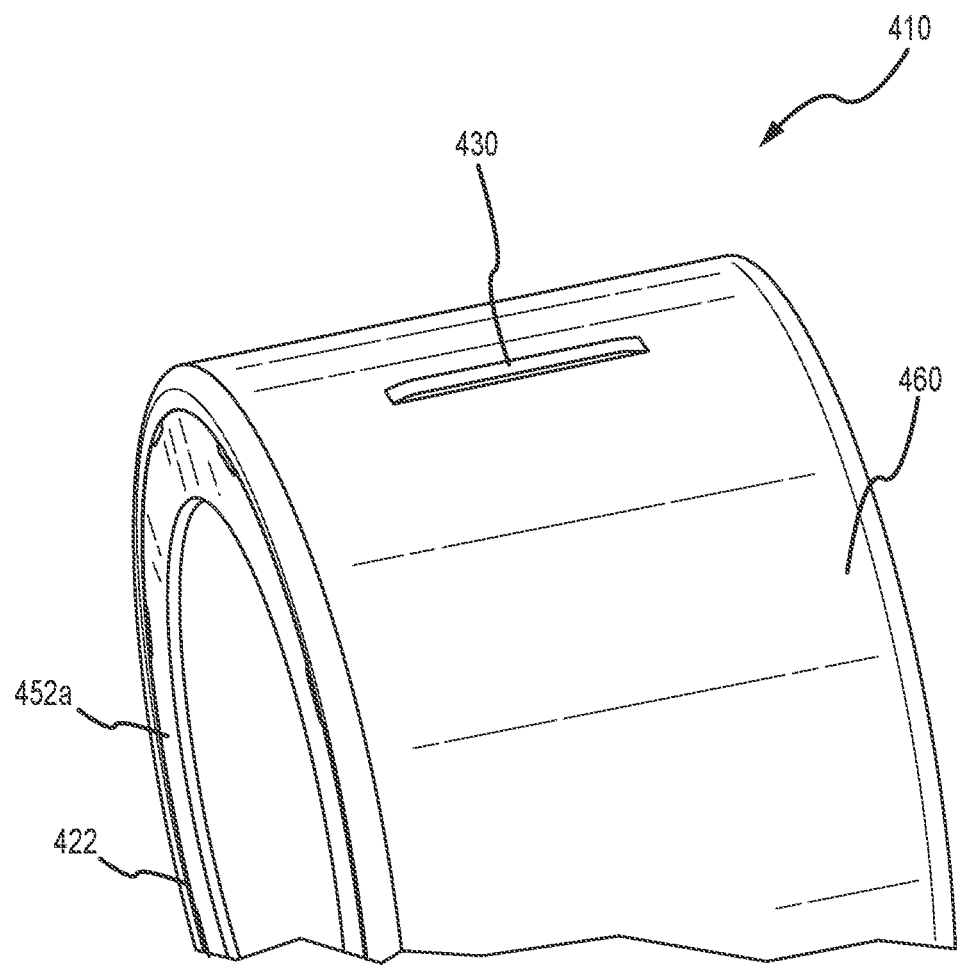
FIG. 5E is a perspective view of an exposed visual wear indicator for the drive wheel of FIG. 5A and indicative of a replacement condition for the tire of the drive wheel, in accordance with various embodiments.
Figure 6:
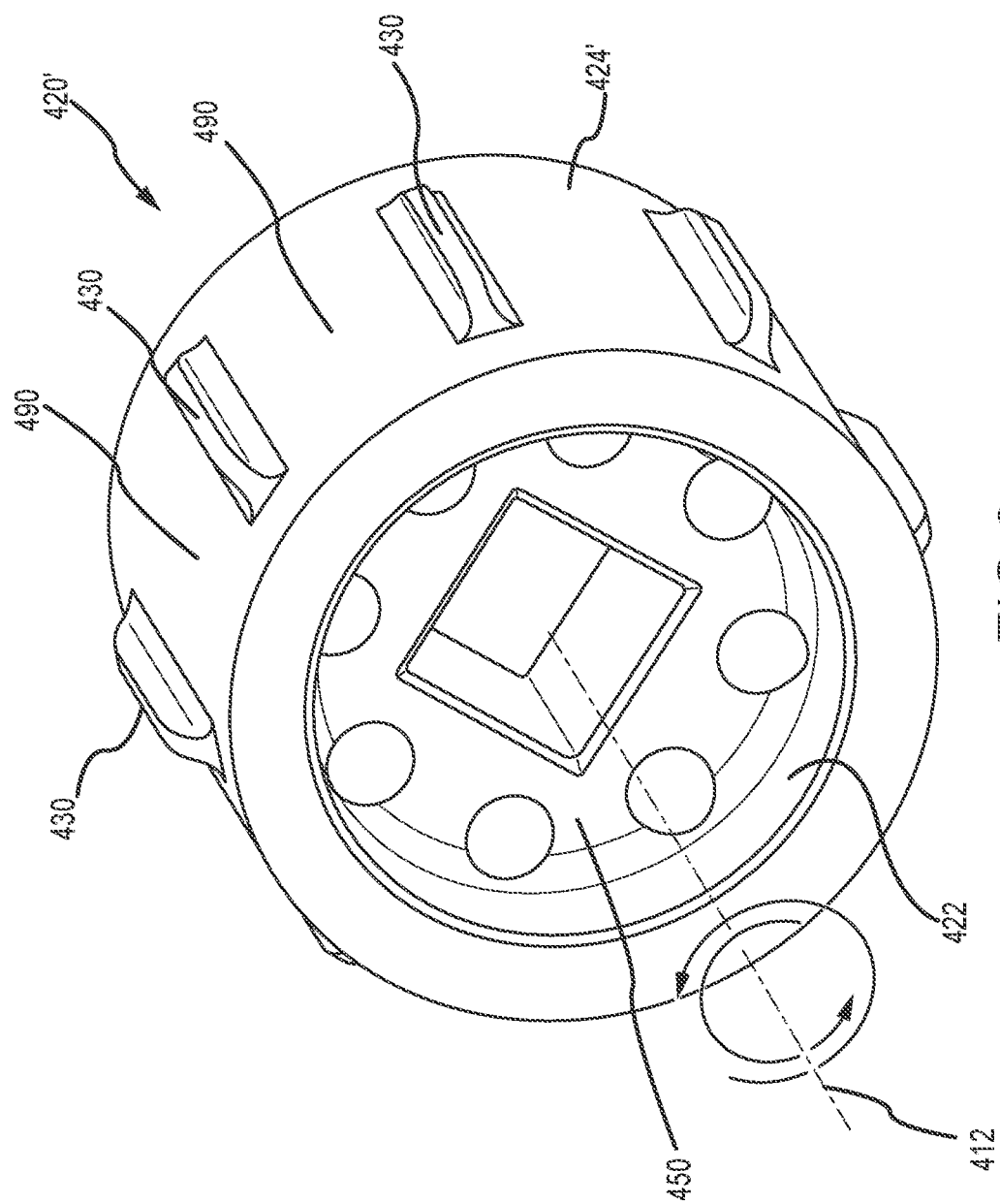
FIG. 6 is a perspective view of a drive wheel for a power drive unit of a cargo handling system, in accordance with various embodiments.

A hub for a drive roller or wheel for a PDU of a cargo handling system is illustrated in FIG. 6, is identified by reference numeral 420', and is in accordance with various embodiments. The hub 420' shown in FIG. 6 is a variation of the hub 420 shown in FIGS. 4-5E, and may be used in place of the hub 420. Generally, the hub 420' shown in FIG. 6 excludes the slots 440 between adjacent pairs of ribs 430. Instead, the hub mounting surface 424' for the hub 420' includes a continuous arcuate surface 490 that extends between each adjacent pair of ribs 430 for the hub 420'. Stated another way, the entirety of the hub mounting surface 424' may be cylindrical except those portions coinciding with the ribs 430. Again, each of the ribs 430 for the hub 420' may be a visual wear indicator for the corresponding tire (e.g., tire 460).

Figure 7:
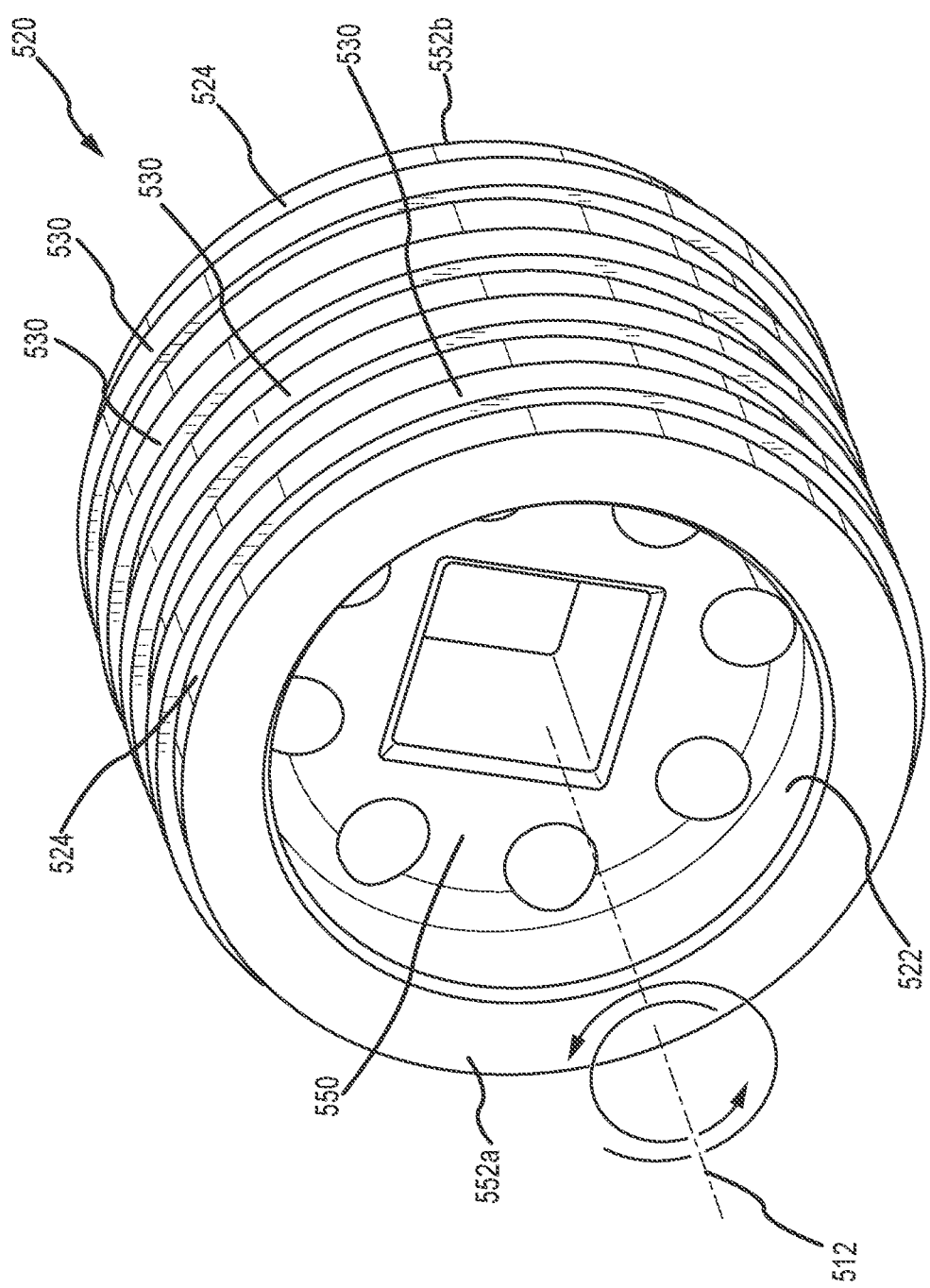
FIG. 7 is a perspective view of a drive wheel for a power drive unit of a cargo handling system, in accordance with various embodiments.

A hub for a drive roller or wheel for a PDU of a cargo handling system is illustrated in FIG. 7, is identified by reference numeral 520, and is in accordance with various embodiments. The hub 520 shown in FIG. 7 may replace the hub 420 for the drive wheel 410 of FIGS. 4-5E.

The hub 520 may be formed from any appropriate material or combination of materials, such as a metal and/or a metal alloy (e.g., aluminum), may be formed in any appropriate manner (e.g., casting, machining), and may be of any appropriate size. The hub 520 may be characterized as including a mount 550 of any appropriate configuration (e.g., for rotatably mounting the hub 520 on an axle or the like) and an annular rim 522 having an annular hub mounting surface, outer surface, or outer perimeter 524. The center of the annular rim 522 may correspond with the location of a rotational axis 512 for the hub 520 and the corresponding drive wheel.

The hub mounting surface 524 of the hub 520 may include one or more protrusions in the form of ribs 530. A remainder of the hub mounting surface 524 of the hub 520 (such a remainder being other than each rib 530) may be cylindrical, with a cylindrical center corresponding with the rotational axis 512 of the hub 520 (and the corresponding drive wheel).

A plurality of ribs 530 may be utilized by the hub 520, each such rib 530 may be of an annular configuration relative to the rotational axis 512 (e.g., proceeding a full 360° about the axis 512) of the hub 520/the corresponding drive wheel, each such rib 530 may protrude radially outward relative to the rotational axis 512 and relative to adjacent portions of the hub mounting surface 524, each such rib 530 may be of any appropriate cross-sectional configuration (taken perpendicular to its corresponding length dimension, or perpendicular to the rotational axis 512), or any combination thereof. Any appropriate spacing between each adjacent pair of ribs 530 may be utilized (an equal spacing being shown), with the ribs 530 being spaced along the rotational axis 512 in the case of the hub 520. Any appropriate number of ribs 530 may be disposed on the hub mounting surface 524 between the two sides 552a, 552b of the hub 520. Each of the ribs 530 for the hub 520 may be a visual wear indicator for the corresponding tire (e.g., tire 460).

Figure 8:
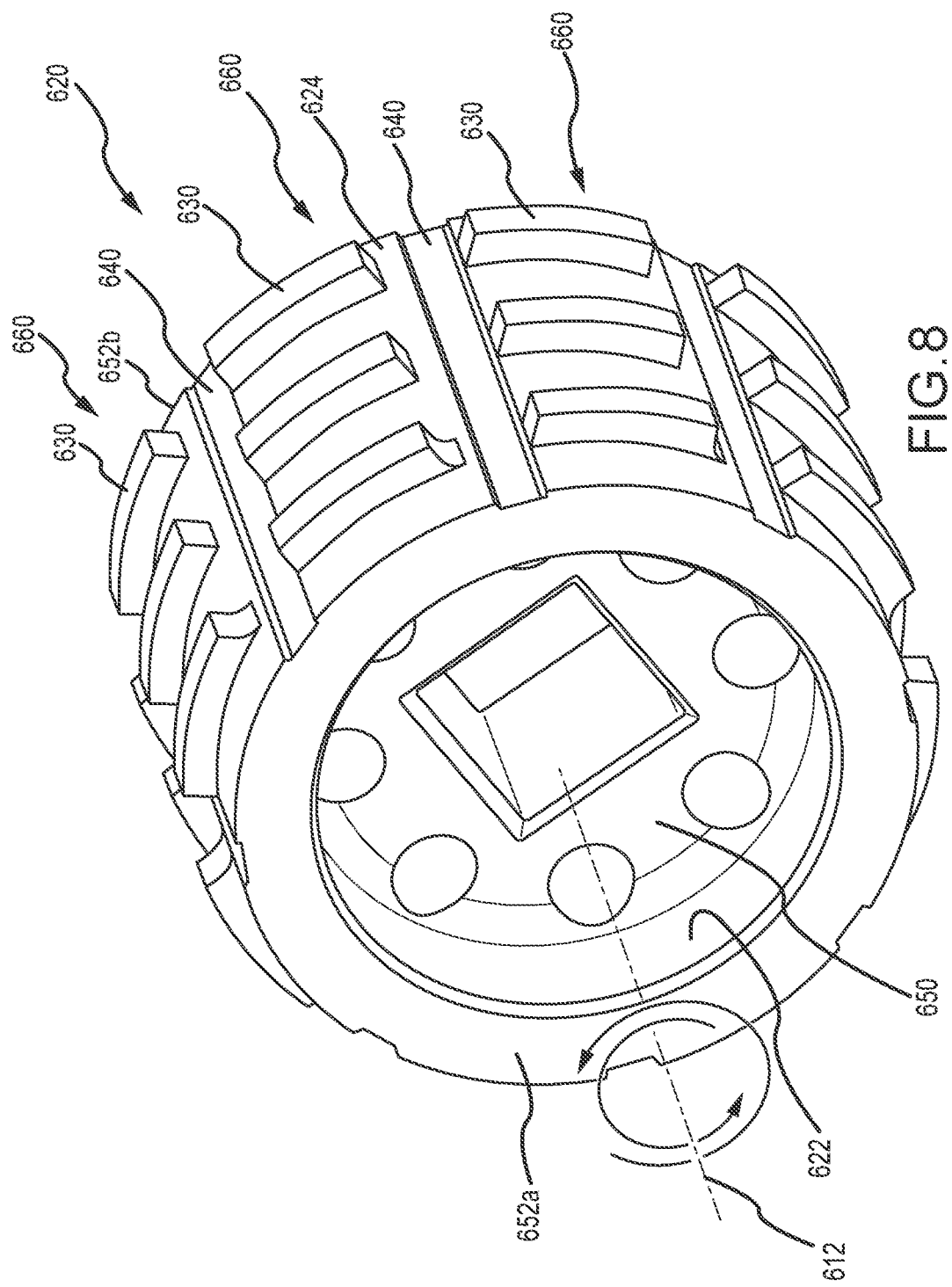
FIG. 8 is a perspective view of a drive wheel for a power drive unit of a cargo handling system, in accordance with various embodiments.

A hub for a drive roller or wheel for a PDU of a cargo handling system is illustrated in FIG. 8, is identified by reference numeral 620, and is in accordance with various embodiments. The hub 620 shown in FIG. 8 may replace the hub 420 for the drive wheel 410 of FIGS. 4-5E.

The hub 620 may be formed from any appropriate material or combination of materials, such as a metal and/or a metal alloy (e.g., aluminum), may be formed in any appropriate manner (e.g., casting, machining), and may be of any appropriate size. The hub 620 may be characterized as including a mount 650 of any appropriate configuration (e.g., for rotatably mounting the hub 620 on an axle or the like) and an annular rim 622 having an annular hub mounting surface, outer surface, or outer perimeter 624. The center of the annular rim 622 may correspond with the location of a rotational axis 612 for the hub 620 and the corresponding drive wheel.

The hub mounting surface 624 of the hub 620 includes one or more protrusions in the form of ribs 630, and may include one or more slots 640 (each slot 640 may be at least generally in accordance with the discussion presented above regarding the slots 440 for the hub 420 of FIGS. 4-5E). A remainder of the hub mounting surface 624 of the hub 620 (such a remainder being other than each rib 630 and each slot 640) may be cylindrical, with a cylindrical center corresponding with the rotational axis 612 of the hub 620 and corresponding drive wheel.

The hub 620 includes a plurality of rib groups 660 that are spaced about the rotational axis 612 of the hub 620 and corresponding drive wheel (e.g., the rib groups 660 being disposed in radially-spaced relation to one another about the rotational axis 612). Any appropriate spacing about the rotational axis 612 may be used between each adjacent pair of rib groups 660 (an equal spacing being illustrated). Each rib group 660 includes a plurality of ribs 630, with each rib 630 being an arcuate segment that proceeds about only a portion of the rotational axis 612 of the hub 620 and corresponding drive wheel, and with each rib 630 being of any appropriate cross-sectional configuration (taken perpendicular to its corresponding length dimension, or perpendicular to the rotational axis 612). Each rib 630 may be of any appropriate arcuate length (e.g., each rib 630 may proceed any appropriate number of degrees about the rotational axis 612), for instance each rib 630 of a given rib group 660 may be of an equal length proceeding about the rotational axis 612. The ribs 630 of each rib group 660 may be at least substantially parallel to one another proceeding along their respective length dimensions (e.g., about the rotational axis 612). Each rib 630 of a given rib group 660 may be radially spaced from and aligned with a corresponding rib 630 of an adjacent rib group 660. The radial spacing between adjacent ends of aligned ribs 630 of adjacent rib groups 660 may resist relative movement between the hub 620 and the corresponding tire (e.g., tire 460).

Any appropriate spacing between each adjacent pair of ribs 630 may be utilized (an equal spacing being shown) within each rib group 660, with the ribs 630 of each given rib group 660 being spaced from one another along the rotational axis 612 in the case of the hub 620. Any appropriate number of ribs 630 may be disposed on the hub mounting surface 624 between the two sides 652a, 652b of the hub 620. Each of the ribs 630 for the hub 620 may be a visual wear indicator for the corresponding tire (e.g., tire 460).

A plurality of slots 640 may be radially spaced about the rotational axis 612 of the hub 620. Any appropriate spacing between each adjacent pair of slots 640 may be utilized (FIG. 8 illustrating a plurality of slots 640 that are equally spaced about the rotational axis 612). FIG. 8 illustrates an alternating arrangement of rib groups 660 and slots 440, with a slot 640 being disposed between each adjacent pair of rib groups 660. One or more slots 640 could be disposed between each adjacent pair of rib groups 660.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

Any feature of any other various aspects addressed in this disclosure that is intended to be limited to a "singular" context or the like will be clearly set forth herein by terms such as "only," "single," "limited to," or the like. Merely introducing a feature in accordance with commonly accepted antecedent basis practice does not limit the corresponding feature to the singular. Moreover, any failure to use phrases such as "at least one" also does not limit the corresponding feature to the singular. Use of the phrase "at least substantially," "at least generally," or the like in relation to a particular feature encompasses the corresponding characteristic and insubstantial variations thereof (e.g., indicating that a surface is at least substantially or at least generally flat encompasses the surface actually being flat and insubstantial variations thereof). Finally, a reference of a feature in conjunction with the phrase "in one embodiment" does not limit the use of the feature to a single embodiment.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A cargo handling system, comprising:
a conveyance surface; and
a power drive unit comprising a drive wheel and a drive source operatively interconnected with the drive wheel, wherein the drive wheel is at least disposable beyond the conveyance surface, and wherein the drive wheel comprises:
a hub comprising a mounting surface, wherein the mounting surface comprises at least one protrusion;

a tire mounted on the hub and that interfaces with the mounting surface and the at least one protrusion;
a rotational axis, the hub and the tire coaxially disposed relative to the rotational axis;
a first configuration where the at least one protrusion is recessed relative to an outer surface of the tire and is indicative of acceptable wear; and
a second configuration where the at least one protrusion is visible on the outer surface of the tire and is indicative of a replacement condition for the drive wheel.

2. The cargo handling system of claim 1, wherein the at least one protrusion comprises a plurality of protrusions, wherein the plurality of protrusions comprises a plurality of ribs, wherein each protrusion of the plurality of protrusions comprises a rib of the plurality of ribs, and wherein a length dimension of each rib is axially extending and oriented at least substantially parallel with the rotational axis of the drive wheel.

3. The cargo handling system of claim 2, wherein the mounting surface further comprises at least one slot disposed between each adjacent pair of ribs.

4. The cargo handling system of claim 3, wherein a length dimension of each slot of the at least one slot is axially extending and oriented at least substantially parallel with the rotational axis of the drive wheel.

5. The cargo handling system of claim 1, wherein the at least one protrusion comprises a plurality of protrusions, wherein the plurality of protrusions comprises a plurality of ribs, wherein each protrusion of the plurality of protrusions comprises a rib of the plurality of ribs, wherein a length dimension of each rib is axially extending, and wherein the mounting surface further comprises a continuous arcuate surface extending between each adjacent pair of ribs.

6. The cargo handling system of claim 1, wherein the at least one protrusion comprises a plurality of protrusions, wherein the plurality of protrusions comprises a plurality of ribs, wherein each protrusion of the plurality of protrusions comprises a rib of the plurality of ribs, and wherein each rib is annular proceeding about the rotational axis of the drive wheel.

7. The cargo handling system of claim 1, wherein the at least one protrusion comprises a plurality of protrusions, wherein the plurality of protrusions comprises a plurality of ribs, wherein each protrusion of the plurality of protrusions comprises a rib of the plurality of ribs, and wherein each rib is an arcuate segment that proceeds about only a portion of the rotational axis of the drive wheel.

8. The cargo handling system of claim 7, further comprising:
a plurality of groups that are spaced about the rotational axis, wherein each group of the plurality of groups comprises multiple ribs spaced along the rotational axis.

9. The cargo handling system of claim 8, wherein the mounting surface further comprises at least one slot disposed between each adjacent pair of the groups.

10. The cargo handling system of claim 9, wherein a length dimension of each slot of the at least one slot is axially extending and oriented at least substantially parallel with the rotational axis.

11. A drive wheel for a power drive unit of a cargo handling system, comprising:
a hub comprising a hub mounting surface, wherein the hub mounting surface comprises a plurality of protrusions;
a tire mounted on the hub, wherein the tire comprises a tire mounting surface and a ULD engagement surface that are spaced in a thickness dimension of the tire, wherein the tire is a solid extending from the tire mounting surface to the ULD engagement surface, and wherein the tire mounting surface is at least one of disposed in contact with or in closely spaced relation to the hub mounting surface and the plurality of protrusions;
a rotational axis, the hub and the tire coaxially disposed relative to the rotational axis;
a first configuration where each protrusion of the plurality of protrusions is recessed relative to an outer surface of the tire and is indicative of acceptable wear; and
a second configuration where at least one protrusion of the plurality of protrusions is visible on the outer surface of the tire and is indicative of a replacement condition for the drive wheel.

12. The drive wheel of claim 11, wherein the plurality of protrusions comprises a plurality of ribs, wherein each protrusion of the plurality of protrusions comprises a rib of the plurality of ribs, and wherein a length dimension of each rib is axially extending and oriented at least substantially parallel with the rotational axis of the drive wheel.

13. The drive wheel of claim 12, wherein the mounting surface further comprises at least one slot disposed between each adjacent pair of ribs, wherein a length dimension of each slot of the at least one slot is axially extending and oriented at least substantially parallel with the rotational axis of the drive wheel.

14. The drive wheel of claim 12, wherein the mounting surface further comprises a continuous arcuate surface extending between each adjacent pair of ribs.

15. The drive wheel of claim 11, wherein the plurality of protrusions comprises a plurality of ribs, wherein each protrusion of the plurality of protrusions comprises a rib of the plurality of ribs, and wherein each rib is annular proceeding about the rotational axis of the drive wheel.

16. The drive wheel of claim 11, wherein the plurality of protrusions comprises a plurality of ribs, wherein each protrusion of the plurality of protrusions comprises a rib of the plurality of ribs, wherein each rib is an arcuate segment that proceeds about only a portion of the rotational axis of the drive wheel, wherein the drive wheel further comprises a plurality of groups that are spaced about the rotational axis, and wherein each group of the plurality of groups comprises multiple ribs spaced along the rotational axis.

17. The drive wheel of claim 16, wherein the mounting surface further comprises at least one slot disposed between each adjacent pair of the groups, and wherein a length dimension of each slot of the at least one slot is axially extending and oriented at least substantially parallel with the rotational axis.

18. A drive wheel for a power drive unit of a cargo handling system, comprising:
a hub comprising a hub mounting surface, wherein the hub mounting surface comprises at least one visual wear indicator;
a tire mounted on the hub and in overlying relation to the at least one visual wear indicator, wherein the at least one visual wear indicator is recessed relative to an outer surface of the tire when the tire has acceptable wear, wherein the at least one visual wear indicator is visible on the outer surface of the tire when the tire has worn and reached a replacement condition; and a rotational axis, the hub and the tire coaxially disposed relative to the rotational axis.

\* \* \* \* \*